3,100,780
PROCESS FOR PREPARING CYCLIC LOWER ALKYLENE SULFATES

Donald L. Klass, Barrington, Ill., assignor to The Pure Oil Company, Chicago, Ill., a corporation of Ohio
No Drawing. Filed Oct. 27, 1961, Ser. No. 148,022
13 Claims. (Cl. 260—327)

This invention relates to new and useful improvements in processes in the preparation of cyclic lower alkylene sulfates from cyclic oxides and sulfur trioxide.

In the past, the reaction of certain aliphatic ethers with sulfur trioxide has been found to result in the formation of the corresponding dialkyl sulfate. Suter and Evans, J.A.C.S., 60, 536 (1838) reported that bis (2-chloroethyl) ether and sulfur trioxide react to form a coordination compound which rearranges on heating to form bis (2-chloroethyl) sulfate. Ham, J. Org. Chem., No. 25, 864 (1960), reports that attempts to prepare cyclic sulfate esters by the reaction of ethylene oxide and sulfur trioxide were unsuccessful except when the sulfur trioxide was reacted as a dioxane-sulfur trioxide complex. Ham reports that all other attempts to react ethylene oxide with sulfur trioxide resulted in excessive charring. The cyclic alkylene sulfate, ethylene sulfate, and its homologues, are well known organic compounds which are useful as intermediates in the preparation of organic sulfur containing compounds.

It is therefore one object of this invention to provide a new and improved process for the preparation of cyclic sulfates from cyclic oxides and sulfur trioxide.

Another object of this invention is to provide an improved process for the preparation of cyclic lower alkylene sulfates in high purity.

A feature of this invention is the provision of an improved process for the preparation of cyclic lower alkylene sulfates by the reaction of sulfur trioxide and a cyclic oxide in the gas phase while maintaining the gaseous reaction mixture at a temperature not in excess of 140° C.

Another feature of this invention is the provision of an improved process in which sulfur trioxide and a cyclic alkylene oxide are reacted in admixture with an inert gas diluent at temperatures not in excess of 140° C. to produce a cyclic alkylene sulfate.

Other objects and features of this invention will become apparent from time to time throughout the specification and claims as hereinafter related.

This invention is based upon my discovery that ethylene sulfate (and other cyclic sulfates) can be prepared smoothly, and with substantially no charring, by the gas phase reaction of ethylene oxide (or other lower alkylene oxides) with sulfur trioxide while maintaining the gaseous mixture at a temperature not in excess of 140° C. The reaction is preferably carried out using an inert diluent gas, such as nitrogen, argon, helium, etc., but can be carried out in the absence of a diluent provided that suitable means is provided to regulate the temperature of the reaction mixture. Where an inert diluent gas is not used, the temperature of the reaction mixture can be controlled by carrying out the reaction in a reactor which is especially designed for rapid removal of heat. Suitable reactors of this type are well known in the art and include such arrangements as reactors containing cold refractory pebbles and reactors provided with water-cooled or air-cooled heat exchange tubes, with or without heat exchange fins. This process is generally applicable to the reaction of sulfur trioxide with lower alkylene oxides (e.g., $C_2$–$C_6$ alkylene oxides) such as ethylene oxide, propylene oxide, trimethylene oxide, butylene oxide, 1,2 epoxy pentane, 1,2 epoxy hexane, etc.

A preferred method of carrying out this process is to continuously introduce controlled flows of sulfur trioxide, alkylene oxide, and inert gas into a reaction vessel (the reaction may require moderate heating at the start, but is highly exothermic once under way), withdrawing unreacted gases overhead from the reaction vessel, and withdrawing the mixed reaction products as a liquid or solid from the bottom of the reaction vessel. The cyclic sulfate which is produced is readily recovered from the mixed product by evaporation and sublimation at relatively high vacuum (at a pressure less than about 10 mm. Hg). The inert gas can be introduced along into the reaction vessel, or it may be mixed beforehand with either the alkylene oxide or sulfur trioxide, or both. However, the alkylene oxides and sulfur trioxide are not mixed until they have entered the reaction vessel. The inert gas is introduced at a flow rate sufficient to moderate the reaction temperature to a value not greater than 140° C.

The proportions of alkylene oxide and sulfur trioxide may vary widely, e.g., 0.1–7.5 mol of sulfur trioxide per mol of alkylene oxide. The pressure in the reactor may be atmospheric, sub-atmospheric, or super-atmospheric, as long as the reaction is carried out in the gas phase at a temperature not exceeding 140° C.

The following non-limiting examples are illustrative of the scope of this invention.

Example I

A glass tube reactor was provided with a steam-jacketed reflux condenser at the upper end and a liquid receiver at the bottom. Ethylene oxide and sulfur trioxide were introduced separately into the reaction tube at rates of 0.01 mol/min. and 0.075 mol/min., respectively, while nitrogen gas was introduced at a rate sufficient to maintain the temperature in the reaction zone below 140° C. The run was carried out for a period of 60 minutes, at the end of which time there was collected 50 g. of liquid product in the liquid receiver. The liquid product which was obtained was sublimed at 80° C. and 1 mm. Hg to yield substantially pure ethylene sulfate as white needles. The product was identified by comparison of its infrared analysis with the infrared analysis of an authentic sample.

Example II

Ethylene oxide and sulfur trioxide are introduced separately into a reaction tube at rates of 0.01 mol/min. and 0.05 mol/min., respectively. The tube is provided with a water-jacketed portion to maintain the surface at the outlet from the reaction zone at a temperature such that the reaction mixture is held below 140° C. A liquid reaction product is obtained from this reaction, from which ethylene sulfate is recovered by evaporation and sublimation under vacuum.

Example III

Propylene oxide and sulfur trioxide are introduced separately into a glass tube reactor at rates of 0.01 mol/min. and 0.02 mol/min., respectively, while nitrogen gas is introduced at a rate sufficient to maintain the reaction mixture at a temperature below 140° C. The top of the reaction tube is provided with a steam-jacketed reflux condenser, while the bottom is provided with a liquid receiver. The liquid product which is collected in the condenser is purified by evaporation and sublimation under vacuum (pressure less than about 10 mm. Hg) to yield crystals of propylene sulfate.

Example IV

Butylene oxide and sulfur trioxide are separately introduced into a glass reaction tube at rates of 0.10 mol/min. and 0.01 mol/min., respectively, while nitrogen gas is introduced at a rate sufficient to maintain the temperature of the reaction mixture below 140° C. The top of the reaction tube is provided with a steam-jacketed reflux condenser, while the bottom is provided with a liquid receiver.

The liquid product which is collected in the receiver is purified by evaporation and sublimation under vacuum to yield crystals of butylene sulfate.

*Example V*

Trimethylene oxide and sulfur trioxide are introduced separately into a glass reaction tube at rates of 0.01 mol/min. and 0.06 mol/min., respectively, while helium gas is introduced at a rate sufficient to maintain the temperature of the reaction mixture below 140° C. The top of the reaction tube is provided with a steam-jacketed reflux condenser while the bottom is provided with a liquid receiver. The liquid product which collects in the receiver is purified by evaporation and sublimation under vacuum to yield crystals of cyclic trimethylene sulfate.

While I have described my invention fully and completely with special emphasis upon several preferred embodiments, I wish it to be understood that within the scope of the appended claims this invention may be practiced otherwise than as specifically described herein.

The embodiments of the invention in which an exclusive property or privilege is claimed are defined as follows:

1. A method of preparing cyclic lower alkylene sulfates which comprises reacting $C_2$-$C_6$ cyclic alkylene oxides with sulfur trioxide in the gas phase while maintaining the gaseous reaction mixture at a temperature not in excess of 140° C.

2. A method in accordance with claim 1 in which the reaction is carried out in the presence of a solid cooling surface.

3. A method in accordance with claim 1 in which the reactants are mixed with an inert diluent gas to maintain a moderate reaction temperature.

4. A method in accordance with claim 1 in which the reaction product is purified by sublimation at a temperature of −10° to +150° C. and a pressure less than about 10 mm. Hg.

5. A method in accordance with claim 1 in which the sulfur trioxide/alkylene oxide mol ratio in the reaction mixture is 0.1–7.5:1.

6. A method in accordance with claim 1 in which the alkylene oxide is ethylene oxide.

7. A method in accordance with claim 1 in which the alkylene oxide is propylene oxide.

8. A method in accordance with claim 1 in which the alkylene oxide is trimethylene oxide.

9. A method in accordance with claim 1 in which the alkylene oxide is butylene oxide.

10. A method of preparing ethylene sulfate which comprises reacting ethylene oxide with sulfur trioxide in the gas phase in admixture with sufficient inert diluent gas to maintain the reaction mixture at a temperature not in excess of 140° C.

11. A method preparing propylene sulfate which comprises reacting propylene oxide with sulfur trioxide in the gas phase in admixture with sufficient inert diluent gas to maintain the reaction mixture at a temperature not in excess of 140° C.

12. A method of preparing trimethylene sulfate which comprises reacting trimethylene oxide with sulfur trioxide in the gas phase in admixture with sufficient inert diluent gas to maintain the reaction mixture at a temperature not in excess of 140° C.

13. A method of preparing butylene sulfate which comprises reacting butylene oxide with sulfur trioxide in the gas phase in admixture with sufficient inert diluent gas to maintain the reaction mixture at a temperature not in excess of 140° C.

References Cited in the file of this patent

UNITED STATES PATENTS

| | | |
|---|---|---|
| 2,684,977 | Viard | July 27, 1954 |
| 2,833,785 | Dietrich et al. | May 6, 1958 |
| 3,022,315 | Rogers et al. | Feb. 20, 1962 |
| 3,045,027 | Ham | July 17, 1962 |

OTHER REFERENCES

Ham: Journal of Organic Chemistry, volume 25, page 864, 1960.